(12) United States Patent
Stevens et al.

(10) Patent No.: US 6,530,171 B2
(45) Date of Patent: Mar. 11, 2003

(54) BERLEY DISPENSER

(76) Inventors: Peter Stevens, 31 Rocky Gully Road, Murray Bridge, South Australia, 5253 (AU); David Fischer, RSD 3151B, Lot 50, Jervois Road, Murray Bridge, South Australia, 5253 (AU)

( * ) Notice: Subject to any disclaimer, the term of this patent is extended or adjusted under 35 U.S.C. 154(b) by 0 days.

(21) Appl. No.: 09/949,829

(22) Filed: Sep. 12, 2001

(65) Prior Publication Data

US 2002/0029510 A1 Mar. 14, 2002

(30) Foreign Application Priority Data

Sep. 11, 2000 (AU) ............................................. PR0009

(51) Int. Cl.[7] ............................................. A01K 97/02
(52) U.S. Cl. ..................................................... 43/44.99
(58) Field of Search .............................. 43/44.9, 42.06, 43/44.99

(56) References Cited

U.S. PATENT DOCUMENTS

| | | | | |
|---|---|---|---|---|
| 1,800,692 A | * | 4/1931 | Mahan | 206/0.5 |
| 2,719,382 A | * | 10/1955 | Schachte | 43/42.06 |
| 2,729,912 A | * | 1/1956 | Moffett | 206/0.5 |
| 2,979,853 A | * | 4/1961 | Erickson | 43/44.99 |
| 3,092,925 A | * | 6/1963 | Ho et al. | 43/42.06 |
| 3,163,959 A | * | 1/1965 | Hollar | 222/174 |
| 4,138,794 A | * | 2/1979 | Chiodini | 43/43.14 |
| 4,685,242 A | * | 8/1987 | Stanish | 43/42.06 |
| 4,959,921 A | * | 10/1990 | Stanish et al. | 43/44.99 |
| 5,033,227 A | * | 7/1991 | Coxwell | 43/44.9 |
| 5,054,230 A | * | 10/1991 | Woodman | 43/42.06 |
| 5,720,124 A | * | 2/1998 | Wentzell et al. | 43/44.99 |
| 6,092,327 A | * | 7/2000 | Nymann | 43/42.06 |

FOREIGN PATENT DOCUMENTS

| GB | 2194721 A | * | 3/1988 |
|---|---|---|---|
| GB | 2196821 A | * | 5/1988 |

* cited by examiner

*Primary Examiner*—Charles T. Jordan
*Assistant Examiner*—Jordan M Lofdahl
(74) *Attorney, Agent, or Firm*—Foley & Lardner

(57) ABSTRACT

The invention relates to a berley dispenser which can hold large pieces of berley. Under the action of wave movement, the berley dispenser chops the berley into smaller pieces which are then dispersed through a series of apertures.

18 Claims, 3 Drawing Sheets

BERLEY DISPENSER

FIELD OF THE INVENTION

The present invention relates to a berley dispenser.

BACKGROUND OF THE INVENTION

Berley dispensers are used by fishermen to attract fish towards the fishing vessel or location where they are fishing. Different forms of berley are used depending on the type of fish to be attracted. For example, the berley may include commercial berley pellets, chopped meat, chopped fish, small bait fish or various combinations thereof.

The present invention seeks to provide an improved berley dispenser.

SUMMARY OF THE INVENTION

According to a first aspect of the present invention there is provided a berley dispenser including a container having a removable lid, a rod extending through said lid and into said container, a plunger secured to said rod and arranged to be located within said container so that said container, lid and plunger define a chamber for receiving berley, and wherein during use relative movement between said container and said rod causes berley to be dispersed through at least one aperture formed in said container or said lid.

Preferably, cutting means is provided on the plunger and/or on an underside of the lid. The cutting means are arranged so that berley received in said chamber sis cut, chopped or ground by said cutting means as a consequence of the relative movement between said container and said rod. Relative movement between said container and said rod is preferably due to the wave action and/or movement of the vessel to which the berley dispenser is secured. Preferably, cutting means is provided on both the plunger and on the underside of the lid.

In a preferred embodiment, the rod extends through an aperture in the lid, through the container and through an aperture formed in a lower end of the container. The rod is arranged to move in a direction parallel to its longitudinal axis so that said plunger is effectively caused to drive or pump up and down within the container. This up and down movement of the plunger causes the berley within the chamber to come into contact with the cutting means to effect cutting, chopping or grinding of the berley.

The upper end of the rod is arranged to be secured to an attachment line so that the berley dispenser can, for example, be secured to a fishing boat or the like.

The lower end of the rod is preferably fitted with a clip, pin or other device so as to prevent the rod from pulling back through the aperture in the lower end of the container. The clip, pin or other device is preferably removable so that the rod can be readily disassembled from the container.

The lower end of the rod is preferably arranged so that a weight can be attached thereto.

In a particularly preferred embodiment, at least one resistor means is provided on the container. The resistor means is arranged to resist movement of the container relative to the rod, so that the rod is caused to move up and down relative to the container.

The resistor means may comprise at least one fin extending from the container, in one particularly preferred arrangement, the resistor means includes a peripheral flange extending about the lower end of the container. The flange has an upwardly projecting peripheral wall.

The container is preferably a tubular cylindrical container and is ideally made from a plastics material. The lid may be hinged to the container, arranged for threaded connection thereto or arranged to be secured to the container by at least one catch or the like. The lid is preferably also made from a plastics material.

The rod is preferably cylindrical and is preferably made from a material such as aluminium that will not rust.

The container preferably includes a plurality of apertures for enabling release of the berley.

The cutting means preferably includes a plurality of sharp projections or teeth. The cutting means are preferably made from a material that will not rust. In one embodiment each of the cutting means is formed from a section of gang nail plate secured to the upperside of the plunger and/or a section of gang nail plate attached to the underside of the lid.

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
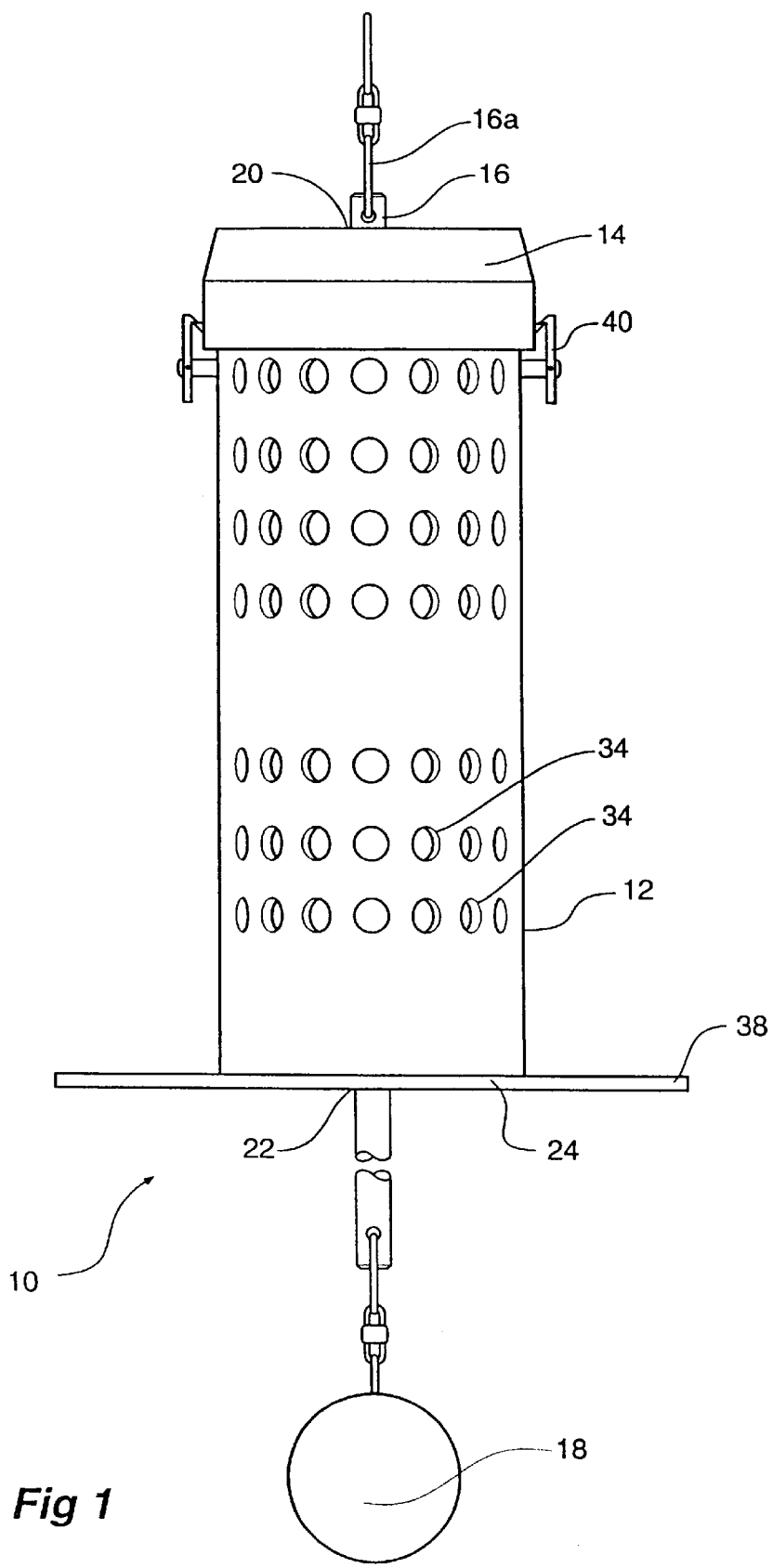
FIG. 1 is a schematic front view of a berley dispenser according to an embodiment of the invention.
Figure 2:
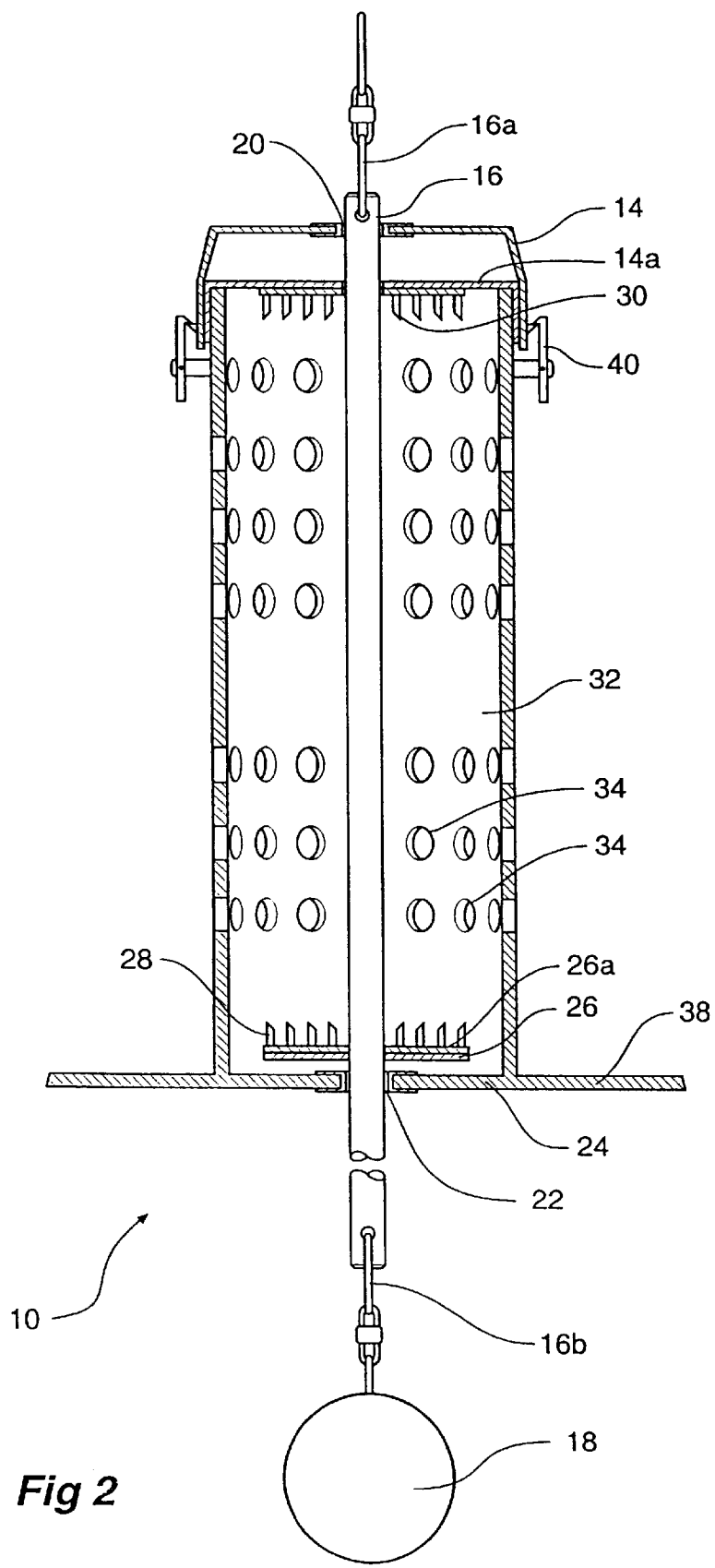
FIG. 2 is a part cross-sectional view of the dispenser shown in FIG. 1.

FIG. 1 illustrates a berley dispenser 10 which is arranged to be secured to a fishing vessel (not shown) by a length of rope or line. The berley dispenser 10 includes a container 12, a lid 14, a rod 16, and a weight 18. As best shown in FIG. 2, the rod 16 extends through an aperture 20 formed in the lid 14, through the container 12 and out through an aperture 22 formed in the lower end 24 of the container 12.

Rigidly attached to the rod 16 and arranged to be located within the container 12 is a plunger 26. Located on the upper face 26a of the plunger 26 is a cutting means 28.

Attached to the underside 14a of the lid 14 is another cutting means 30. The underside 14a of the lid, upper side 26a of the plunger 26 and wall of the container 12 define a chamber 32 for receiving berley.

As will be explained in more detail below, during use of the berley dispenser 10, relative movement between the container 12 and the rod 16 causes the barley to be dispersed through at least one aperture 34 formed in the container 12. The cutting means 28, 30 are arranged so that berley received in the chamber 32 is cut, chopped or ground by the cutting means 28, 30 as a consequence of the relative movement between the container 12 and the rod 16. In other words, as the plunger 26 is caused to move up and down within the container 12 as a result of wave action and/or movement of the fishing vessel to which the dispenser 10 is attached, the cutting means 28, 30 are caused to engage with the berley located within the chamber 32. Contact between the berley and the cutting means 28, 30 results in the barley being cut, chopped and/or ground into smaller pieces which can then be released through the at least one aperture 34 formed in the container 12.

The rod 16 is preferably made from a material such as aluminium which will not rust. The rod 16 is preferably cylindrical in cross section and has an upper end 16a which is arranged for attachment to a securing line. The lower end 16b of the rod 16 is arranged for attachment to the weight 18. The weight 18 is positioned on the berley dispenser 10 to prevent the dispenser 10 from inadvertently floating to the water surface. The weight 18 is arranged to be quickly and easily removed from the lower end 16a of the rod 16. Although not illustrated, the rod 16 may also be fitted with a clip, pin or other device which prevents the lowerend 16a of the rod 16 from inadvertently pulling back through the aperture 22 formed in the lower end 24 of the container 12. The clip, pin or other device is removable so that the rod 16 can be easily disassembled from the container 12.

Attached to the lower end 24 of the container 12 or integrally formed therewith is a resistor means 38. The resistor means 38 may be formed as a flange extending from the container 12 or at least one fin extending outwardly from the wall of the container 12. The resistor means 38 is arranged to resist movement of the container 10 relative to the rod 16, so that the plunger 26 is caused to move up and down within the container 12 to thereby cause cutting, chopping and/or grinding of the berley contained in the chamber 32.

The container 12 is preferably a tubular cylindrical container made of a plastics material. The peripheral wall of the container 12 is preferably formed with a plurality of apertures 34 through which the berley can be dispersed. The size, number and location of the apertures 34 may be varied to meet different berley disbursement requirements and the nature of the berley being used in the dispenser 10. The Figures show use of a plurality of circular apertures. However, it is envisaged that the wall of the container 12 may instead include a series of vertical slots spaced thereabout. The slots being sized so as to enable ready release of the chopped berley. The lid 14 and/or lower end 24 of the container 12 may also include berley releasing apertures.

The lid 14 is preferably circular in shape and is made from a plastics material. The lid 14 may be hinged to the container 12, arranged for threaded connection thereto or arranged to be secured to the container 12 by at least one catch 40 or the like. The lid 14 must be removable to enable berley to be positioned within the chamber 32.

In a preferred embodiment, the cutting means 28 is formed from a section of gang nail plate which is attached to the upper side 26a of the plunger 26 by screws, rivets or the like. Generally, the cutting means 30 on the underside of the lid 14 is also a section of gang nail plate which is secured to the lid 14 by screws, rivets or the like. It is envisaged that the cutting means 28, 30 may be formed in a number of different ways. However the cutting means 28, 30 must be sufficiently sharp to enable cutting, chopping or grinding of berley during use of the berley dispenser 10.

During use of the barley dispenser 10, rod 18 will slide against the bore of the apertures 20, 22. To prevent wear and damage to the material of the lid 14 and lower end 24 of the container 12, the apertures 20, 22 may be fitted with a metal sleeve (not shown).

Prior to use of the berley container 10, the lid 14 is removed and berley is located within the chamber 32. Typically, the berley may include commercial berley pellets, chopped meat, chopped fish, small bait fish or various combinations thereof. The embodiment of the present invention allows quite large pieces of fish or other products to be used in the berley dispenser 10 because resultant up and down movement of the plunger 26 due to wave motion and the movement of the fishing vessel to which the berley dispenser 10 is attached, results in cutting, chopping and/or grinding of the berley. This cutting, chopping and/or grinding of the berley results in the berley being broken down so that small pieces of barley can be released through the apertures 34 formed in the container 10.

It will be appreciated that typically, the rod 16 would be sized and the plunger 26 connected to the rod 16 at a position so that the maximum sized chamber 32 can be achieved within the container 10. This enables large amounts of berley to be initially placed in the chamber 32. It will be readily apparent that when the chamber 32 is at its maximum capacity, movement of the plunger 28 will be restricted by contact with the berley contained in the chamber 32. This contact will result in cutting, chopping and/or grinding of the large pieces of berley so that smaller pieces are formed. These smaller pieces of berley will be released through the apertures 34 thus allowing greater movement of the plunger 26 within the container 12.

Although the embodiment described includes use of cutting means, it is envisaged that in an alternative embodiment the cutting means 28, 30 may be excluded. The berley dispenser 10 would then release berley due to natural breakdown of berley in the chamber due to contact with the water and also due to the up and down movement of the plunger 16 within the container 12.

Figure 3:
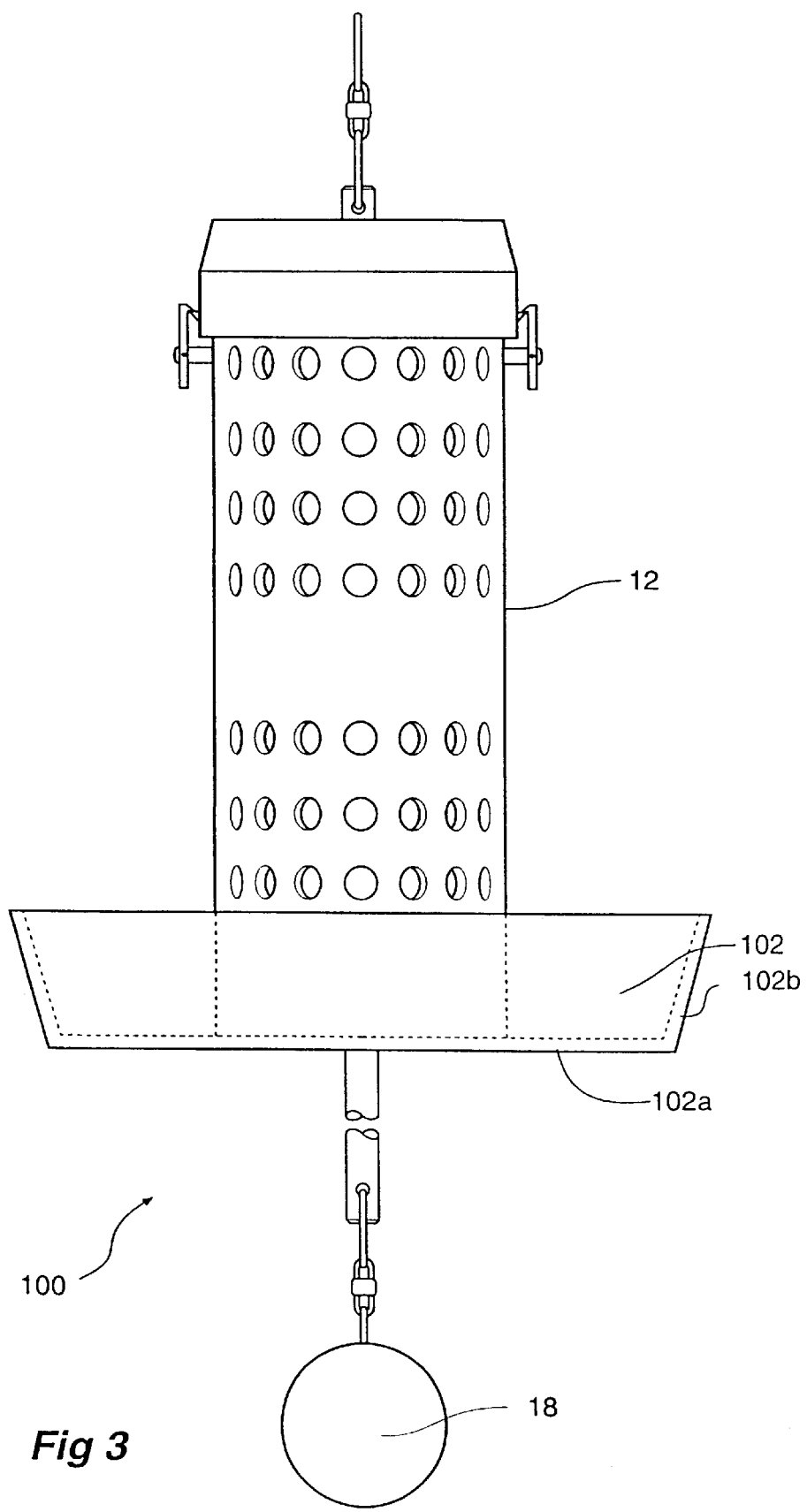
FIG. 3 is a schematic front view of a berley dispenser according to a second embodiment of the invention.

FIG. 3 illustrates an alternative arrangement of the berley dispenser. The dispenser 100 shown in FIG. 3 is similar to that shown in FIG. 1 except for the configuration of the resistor means 102. The resistor means 102 in accordance with this embodiment has a peripheral flange portion 102a which extends about the lower end of the container 12. The flange portion 102a has an upwardly projecting peripheral wall portion 102b. The resistor means 102 thereby adopts the form of a "bowl" on the lower end of the container 12.

The embodiments have been described by way of example only and modifications are possible within the spirit and scope of the invention.

What is claimed is:

1. A berley dispenser including a container having a removable lid, a rod extending through said lid and into said container, a plunger secured to said rod and arranged during use of said dispenser to be located within said container so that said container, lid and plunger define a chamber for receiving berley, cutting devices located on both the plunger and the underside of the lid and wherein during use relative movement between said container and said rod causes berley within the chamber to be cut and dispersed through at least one aperture formed in said container or said lid.

2. A berley dispenser according to claim 1 wherein the rod extends through an aperture in the lid, through the container and through an aperture formed in a lower end of the container.

3. A berley dispenser according to claim 2 wherein the rod is arranged for movement in a direction parallel to its longitudinal axis so that during use said plunger is caused to drive up and down within the container.

4. A berley dispenser according to claim 1, wherein the rod has an upper end which is arranged to be secured to an attachment line or the like.

5. A berley dispenser according to claim 1, wherein the rod has a lower end which is fitted with a clip, pin or other device so as to prevent the rod from pulling back through the aperture in the lower end of the container.

6. A berley dispenser according to claim 5 wherein the clip, pin or other device is removable so that the rod can be readily disassembled from the container.

7. A berley dispenser according to claim 5 wherein the lower end of the rod is arranged so that a weight can be attached thereto.

8. A berley dispenser, according to claim 1 further including at least one resistor device arranged to resist movement of the container relative to the rod, so that the rod is caused to move up and down relative to the container.

9. A berley dispenser according to claim 8 wherein the resistor device includes at least one fin extending from the container.

10. A berley dispenser according to claim 9 wherein the resistor devices includes a peripheral flange extending about the lower end of the container, said flange having an upwardly projecting peripheral wall.

11. A berley dispenser according to claim 1, wherein the container is a tubular cylindrical container.

12. A berley dispenser according to claim 1, wherein the lid is hinged to the container, arranged for threaded connection thereto or arranged to be secured to the container by at least one catch or the like.

13. A berley dispenser according to claim 1, wherein the container includes a plurality of apertures for enabling release of the berley.

14. A berley dispenser according to claim 13 wherein the apertures are formed as elongate slots.

15. A berley dispenser according to claim 1 wherein the cutting devices includes a plurality of sharp projections.

16. A berley dispenser according to claim 15 wherein each of the cutting devices is formed from a section of gang nail plate secured respectively to an upperside of the plunger and to the underside of the lid.

17. A berley dispenser according claim 1 wherein the rod and the cutting devices are made from a material that will not rust.

18. A berley dispenser according to claim 1 wherein the container and the lid are made from a plastics material.

* * * * *